Jan. 8, 1935. W. V. BERGEN ET AL 1,987,357
REFLECTOR
Filed Jan. 8, 1932 4 Sheets-Sheet 1
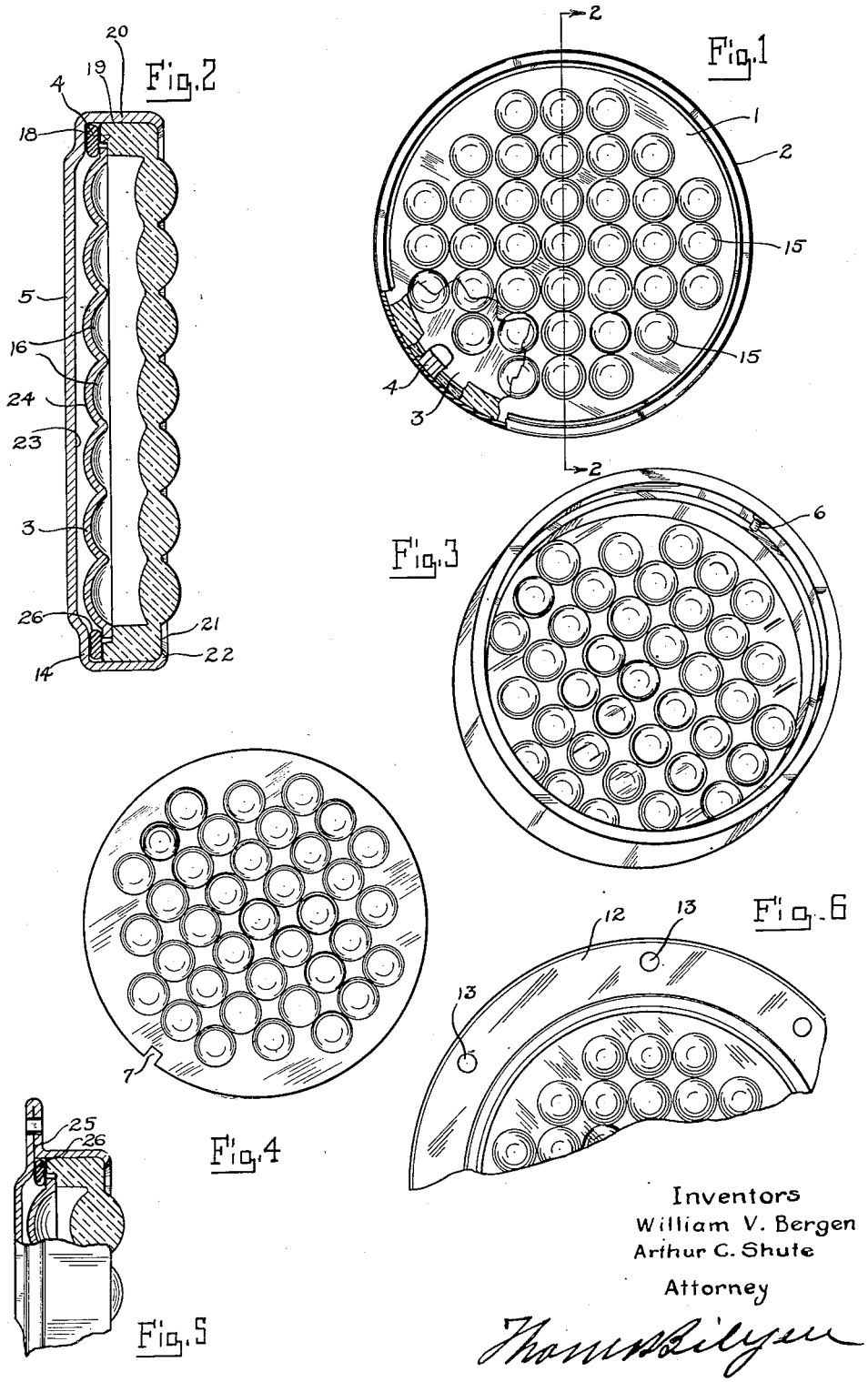

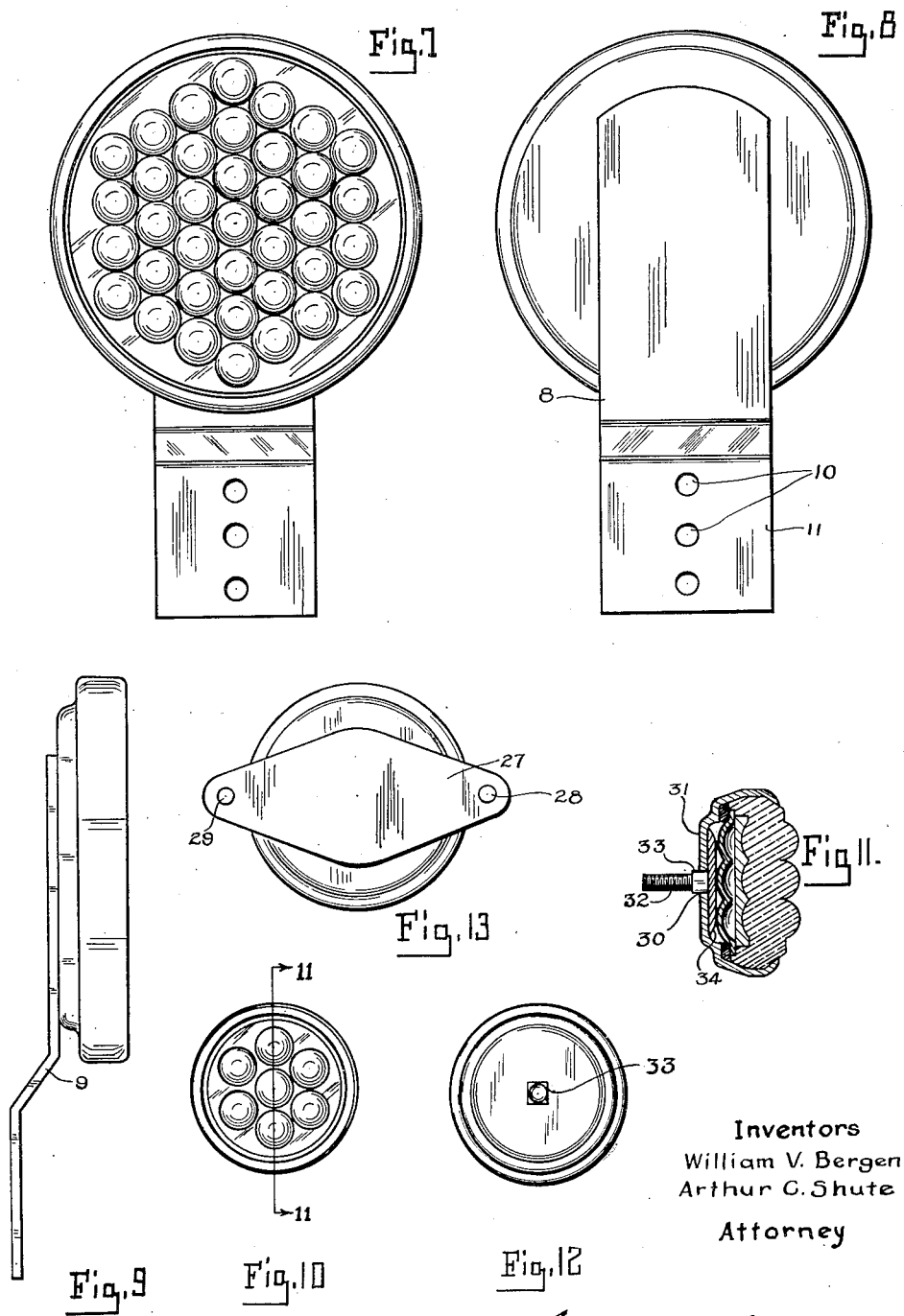

Jan. 8, 1935. W. V. BERGEN ET AL 1,987,357
REFLECTOR
Filed Jan. 8, 1932 4 Sheets-Sheet 3
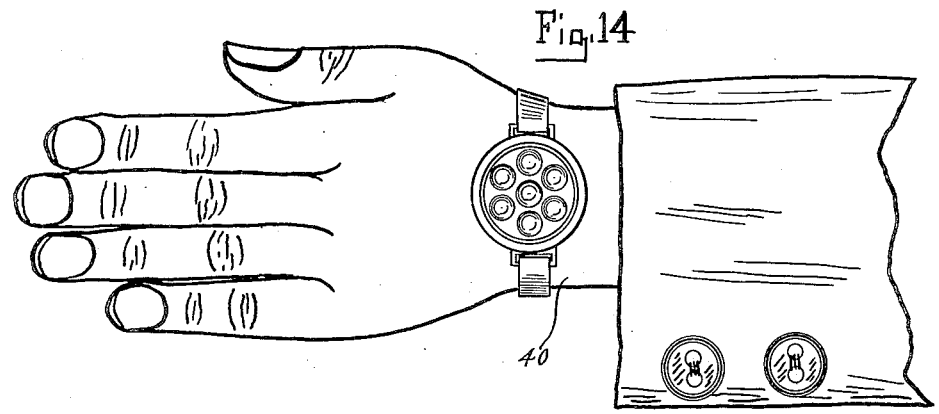
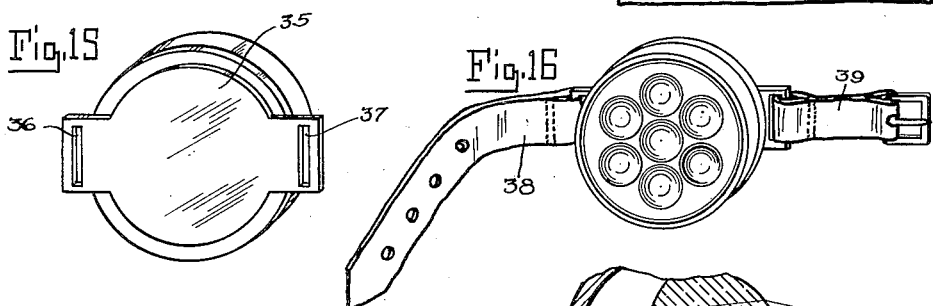
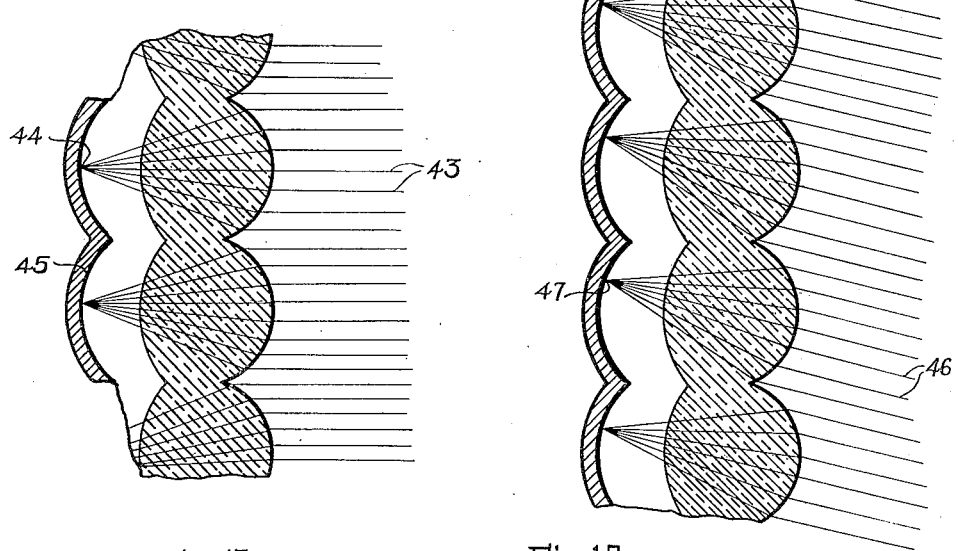
Inventors
William V. Bergen
Arthur C. Shute
Attorney Jan. 8, 1935. W. V. BERGEN ET AL 1,987,357
REFLECTOR
Filed Jan. 8, 1932 4 Sheets-Sheet 4
Fig. 19
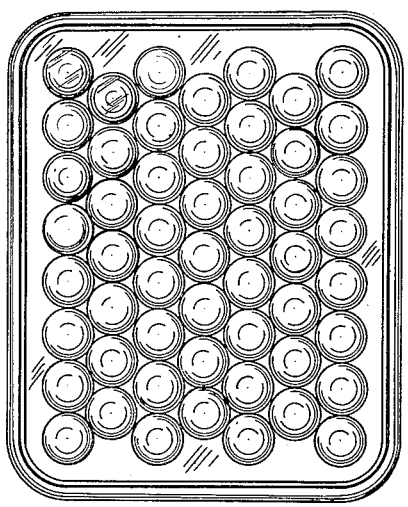
Fig. 20
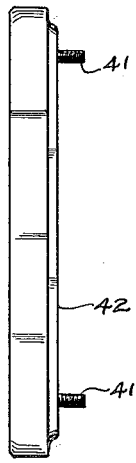
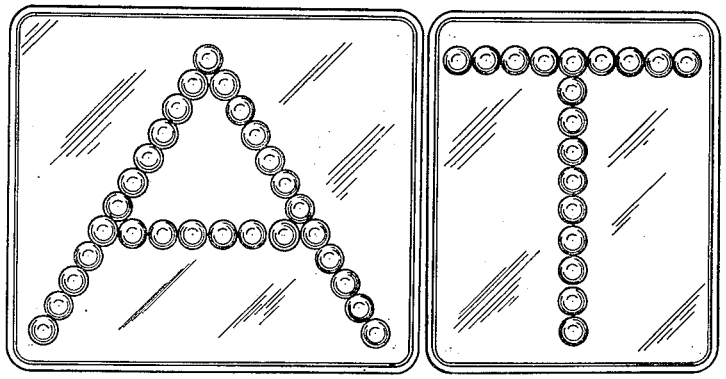
Fig. 21
Inventors
William V. Bergen
Arthur C. Shute
Attorney Patented Jan. 8, 1935

1,987,357

UNITED STATES PATENT OFFICE 1,987,357

REFLECTOR

William V. Bergen, Hillsboro, and Arthur C. Shute, Portland, Oreg.

Application January 8, 1932, Serial No. 585,512

5 Claims. (Cl. 88—1)

Our invention is primarily adapted and intended for use in all locations where it is found desirable to impart information of any character for day, or night use through the use of reflected rays of light.

The invention is primarily comprised of a transparent body element having a plurality of lenses formed integral therewith. A reflecting surface is disposed at the rear of the lenses and in spaced relationship therewith and positioned at the focal point of each of the lenses. Means is provided for securing a casing to the transparent member having the lenses formed integral therewith. Said reflector is hermetically sealed within the casing and is disposed at the focal point of each of the lenses. Means is provided for securing the assembly to a supporting surface.

The primary object of our invention is to provide a reflector that is comprised of few parts and that may be efficiently used for reflecting the rays of light for either day, or night use. The invention is particularly adapted for being used along highways, at bridge heads and culvert crossings along the highways for indicating curves, grades and danger points.

The invention may be used with equal facility as signals of danger to be placed upon all classes of vehicles such as automobiles, motor busses, stages and trucks, upon motor boats, airships and upon trains, cars and locomotives and in fact in any and all places where it is desired to indicate through the use of reflected light, information of any kind.

The invention may be used with equal facility for indicating street names, street numbers and house numbers.

A further object of our invention consists in so constructing our new article of manufacture that the same will have long life and will be free from operating annoyances due to temperature changes, weather conditions and the like.

A further object of our invention consists in so constructing our device that the reflector will be hermetically sealed relative to the lens associated with it so that moisture may not be permitted to enter the assembly and thereby dim, or destroy the reflecting surface that is disposed at the focal point of the lens.

A still further object of our invention consists in providing a new article of manufacture that is low in first cost and adapted to mass production, and one that may efficiently reflect light both for day and night use.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view, partially in section of the assembled unit in one of its preferred embodiments.

Fig. 2 is a sectional, side view of the mechanism illustrated in Fig. 1, the same being taken on line 2—2 of Fig. 1, looking in the direction indicated.

Fig. 3 is a perspective, inverted, rear view of the lens, removed from the jacket.

Fig. 4 is a plan view of the reflector unit removed from the jacket.

Fig. 5 is a fragmentary, sectional, side view of a modified form of jacket having a flanged base.

Fig. 6 is a fragmentary, plan view of the jacket illustrated in Fig. 5.

Fig. 7 is a front view of an assembled unit adapted for being used as a tail light for an automobile.

Fig. 8 is a rear view of the mechanism illustrated in Fig. 7.

Fig. 9 is a side view of the mechanism illustrated in Figs. 7 and 8.

Fig. 10 is a front view of a modified form of a reflector unit.

Fig. 11 is a sectional, side view of the mechanism illustrated in Fig. 10, the same being taken on line 11—11 of Fig. 10, looking in the direction indicated.

Fig. 12 is an inverted, plan view of the mechanism illustrated in Figs. 10 and 11.

Fig. 13 is a modified form of base secured to the units illustrated in Figs. 10 to 12 inclusive, with a slightly modified form of supporting base or back.

Fig. 14 illustrates one of the units illustrated in Figs. 10 to 13 inclusive, in which the reflector unit may be used on the hand of a driver of a motor vehicle and held in place by a wrist band.

Fig. 15 is an inverted plan view of the reflector unit illustrated in Fig. 14.

Fig. 16 is a perspective, front view of the unit illustrated in Figs. 14 and 15 and illustrating a wrist band secured thereto.

Fig. 17 is a fragmentary, sectional side view of the lens and of the reflector unit disposed therebehind and illustrating the reflector unit as reflecting rays delivered centrally of the reflector unit from the lens and illustrating the rays being projected through the lens at right angles to the primary surface of the lens.

Fig. 18 illustrates the reflecting rays as being reflected at an angle to that of the primary surface of the lens. A lens made as illustrated at Figs. 17 and 18 has a wider angle of reflection than lenses heretofore made.

Fig. 19 is a front view of a modified form of holder and reflector similar to those illustrated in previous views.

Fig. 20 is a side view of the assembled unit illustrated in Fig. 19.

Fig. 21 is a front view of a reflector unit comprised of a primary surface having a plurality of lenses formed integral therewith and having a reflector disposed therebehind and the plurality of lenses being arranged to represent the letters of the alphabet, or any other suitable indicia.

Like reference characters refer to like parts throughout the several views.

Our invention relates to reflecting lights that are to be used for any and all purposes where a reflecting light is desired either for day, or night use.

The invention is comprised primarily of a transparent member 1, a jacket, or casing 2 and a reflector 3. A gasket 4 may be placed between the back wall 5 of the jacket and the reflector to precisely position and locate the reflector within the casing. A projecting lug 6 is positioned and inwardly extends from the inner side wall of the transparent member into which a notch 7 of the reflector is made to engage to precisely fit the reflecting element relative to that of the transparent member.

Where the assembly is to be used as a tail light for an automobile, a fastening plate 8 is secured to the rear wall of the jacket by any suitable fastening means as by being welded thereupon. An offset 9 is disposed within the plate and fastening holes 10 are disposed in the shank 11 of the fastening plate.

Where the reflector is to be fastened directly upon any suitable supporting media a flange 12 may be formed on the outer periphery of the jacket and fastening holes 13 be spaced therearound.

The casing preferably has a relatively smooth surface formed centrally of its back and a ledge 14 is formed adjacent its edge to form a suitable support for the gasket 4 thereupon. The transparent member has a plurality of lenses 15 disposed and formed integral therein. A plurality of concave depressions are formed in the reflector 3. The reflector is made of a single piece and the concave reflectors disposed therein are each placed at the focal point of one of the lenses, the concavities 16 being highly polished and placed in direct registerable alignment with the lenses. A ledge 18 is formed in the rear wall of the transparent member into which the reflector comes to rest.

The side wall 19 of the transparent member is made to precise measurements in order that the side wall 20 of the jacket may be made to precisely fit the same, and an annular face 21 is disposed upon the front wall of the transparent member over which a rim 22 of the jacket may be reamed. The reaming, or turning of the casing about the transparent member hermetically seals the reflector within the assembly and precisely positions the same therein and prevents moisture entering the assembly. The inner wall 23 of the jacket is in spaced relationship with the rear wall 24 of the reflector.

Where the device is to be secured to a fastening disposed upon the rim as illustrated at 12 and 13 the jacket is folded over itself as illustrated at 25. The gasket 26, being so positioned that the reflector is hermetically sealed within the lens even though the fastenings passing through the holes 13 do not hermetically seal the same at the holes.

For certain classes of work it may be necessary to secure a plate fastener 27 to the rear face of the reflector as illustrated in Fig. 13 and when so made holes 28 and 29 are placed in the outer ends of the plates through which suitable fasteners may be made to pass.

An extremely small reflector may be made as illustrated in Figs. 10, 11 and 12 and when so made a hole 30 is disposed centrally of the rear face 31 of the jacket and a fastening bolt 32 is passed therethrough. The bolt may have a squared portion 33 disposed adjacent its head to prevent the reflector turning about the squared portion of the bolt.

A relatively large thin head 34 is placed upon the fastening bolt 32 to reinforce the jacket member. Where it may be found desirable to use a reflector of this type for use upon the hand, or arm of motor vehicle operators to indicate the signals of the operator of the vehicle, a fastening plate 35 may be placed upon the rear of the jacket having slits 36 and 37 disposed in its oppositely disposed ends through which wrist straps 38 and 39 may be made to pass to form a wrist band that may be passed about the wrist of the wearer for removably securing the same to the wrist 40 of the wearer of the same. The jacket member may be made as illustrated in Figs. 19 and 20 to form a jacket having parallel sides and parallel ends and fastening bolts 41 be made to pass through the rear wall 42 of the jacket for securing the reflector light in position.

For use in any and all places where it may be desired to spell out words as for use upon highways where the word, "stop", or, "curve", or, "railroad crossing", is desired to be indicated, or where the reflector light is to be used for house numbering or street naming the lenses may be formed into indicia to indicate letters of the alphabet, or numerals, as illustrated in Fig. 21, and when so made the jacket member and the reflectors are hermetically sealed relative to each other with the reflector concavities being disposed immediately in registerable alignment with the lens indicia. The indicia forming reflectors may be made and assembled and supported as units and be assembled in place and position within any suitable holder and removed therefrom as the same become damaged or broken, with the greatest facility. Th focal point of each of the lenses is so positioned as to place the lens for light axially incident to each of the concave reflecting surfaces formed within the reflector that is placed therebehind.

The construction here shown and particularly emphasized in Figs. 17 and 18 produces a reflecting unit of the type here outlined having a much wider range of observation than has heretofore been possible. Where the projecting rays are normal to the lenses as illustrated in Fig. 17 at 43, the same pass through the lens and strike the focal point 44 central of the concave reflector 45 placed therebehind, and the rays are reflected back to illuminate practically the entire surface of the lens. Where the rays 46 are incident at an acute angle the same pass through the lens and strike a focal point 47 off center of the concave surface of the reflector and are projected back to give practically the full range of visibility of the reflected rays as is possible at the right angle projected rays. This is believed to be a new accomplishment and discovery for reflected lights and produces a very thin reflector that may be used for many purposes heretofore not possible and gives a maximum possible range of reflection with a very much greater range of visibility than heretofore possible.

While the form of mechanism shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What we claim is:

1. In a device of the class described, the combination of a transparent member, a one piece casing, the casing having a back wall that lies in a single plane, a ledge disposed about the outer periphery of the casing, a compressible gasket disposed upon the ledge, the transparent member having an annular side wall rearwardly extending from its face, an annular recess formed within the rear wall of the side wall of the transparent member to form a ledge upon its outer periphery, a reflector mounted within said ledge, a lug outwardly extending from the face of the ledge of the transparent member, a notch formed within the outer periphery of the reflector to engage the lug to precisely position the reflector relative to the face of the transparent member, the side wall of the casing fitting the side wall of the transparent member, an annular face disposed upon the front of the transparent member, a rim formed upon the periphery of the casing adapted to compress the transparent member upon the compressible gasket and to hermetically seal the reflector within the casing, a plurality of lenses formed integral with the transparent member, and a plurality of concavities formed in the front face of the reflector and placed in focal alignment with the lenses of the transparent member.

2. In a device of the class described, the combination of a one piece transparent member, a jacket having a compressible gasket disposed therein, the said gasket being disposed between the rear wall of the transparent member and the rear wall of the casing member, a reflector resting upon the gasket and positioned and compressed thereupon by the rear face of the transparent member, to thereby hermetically seal the transparent member with respect to the casing and in spaced relationship with the rear wall thereof, a plurality of lenses formed integral with the transparent member, a plurality of reflecting concavities formed in the reflector, the said concavities being placed at the focal points of the lenses, a fastening plate secured to the rear wall of the casing, an offset formed in the fastening plate, a shank outwardly extending from the offset and fastening holes disposed within the shank.

3. In a device of the class described, the combination of a one piece transparent member having a plurality of lenses formed integral therewith, each of the lenses having convex inner and outer faces, a casing precisely fitting and hermetically sealing the body of the transparent member, a reflector disposed within the casing and hermetically sealed therein relative to the transparent member, the reflector comprising a single piece and having a concave reflecting surface for each of the lenses disposed within the transparent member, one each of the concave reflecting surfaces being disposed at the focal point of one of the lenses and the lenses being so disposed as to form indicia.

4. In a device of the class described, the combination of a one piece transparent member having an annular wall formed with an annular shouldered portion, said transparent member formed with inwardly and outwardly extending convex portions in alignment with each other, a circular reflector formed with a plurality of concave reflecting surfaces in alignment with said convex portions of the transparent member, said reflector adapted to lie within said shouldered portion of the wall of said transparent member, a compressible gasket disposed around the united edges of said reflector and transparent member, and a casing snugly embracing said transparent member and said gasket.

5. In a device of the class described, the combination of a one piece circular transparent member formed with convex lens portions on both of its sides and in alignment with each other, a rearwardly extending peripheral wall formed integral with the transparent member, an annular shoulder formed in the rearmost edge of said wall, a reflector seated within the shouldered portion and thereby held in spaced relation to the said lenses, a gasket overlying the peripheral edge of said reflector and the rear face of the peripheral wall to hermetically seal the reflector, and a casing snugly embracing said transparent member and gasket under pressure to maintain said sealed relation.

WILLIAM V. BERGEN.
ARTHUR C. SHUTE.